(No Model.)
R. BETTERMANN.
CAR AXLE.
No. 531,405. Patented Dec. 25, 1894.
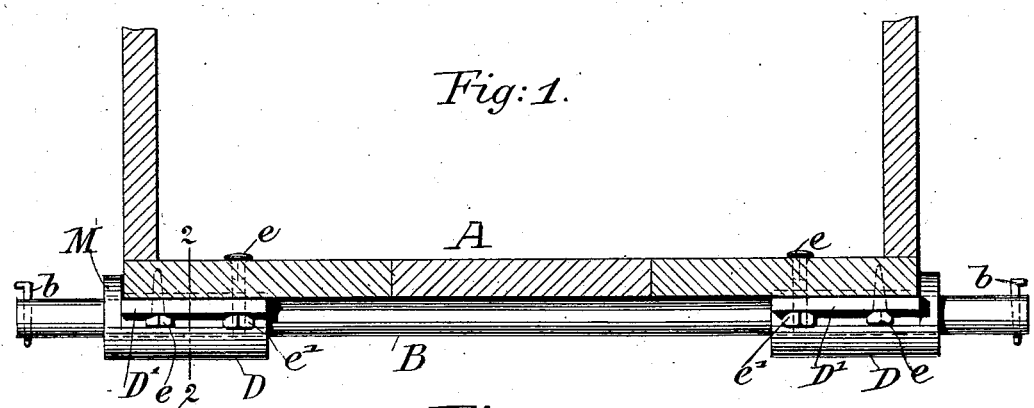
Fig: 1.
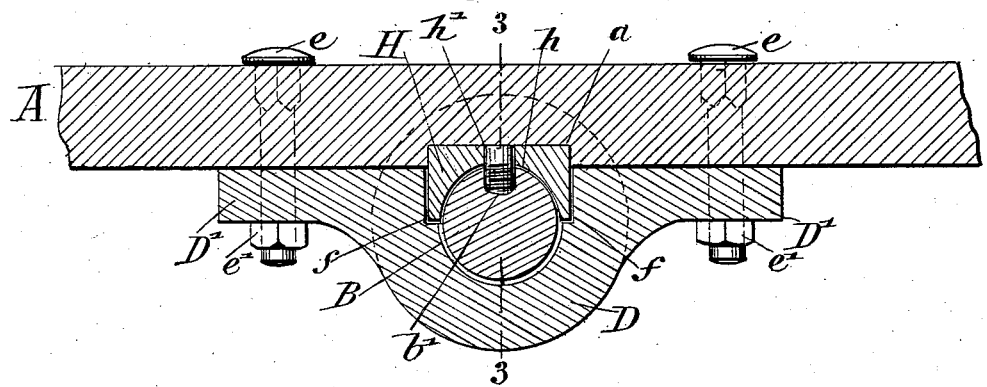
Fig: 2.
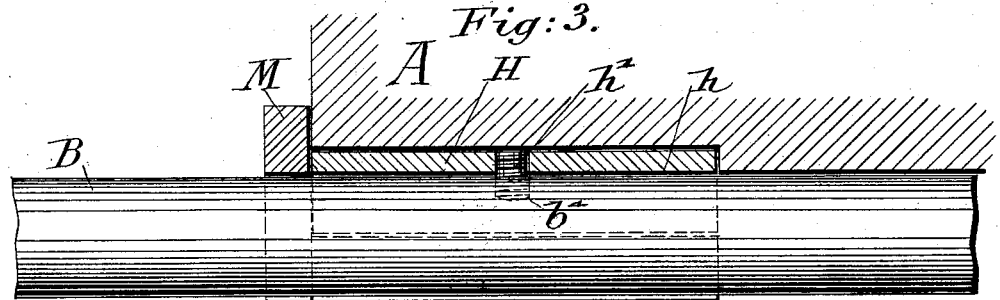
Fig: 3.
WITNESSES:
INVENTOR
Reinhold Bettermann
BY
ATTORNEYS.

UNITED STATES PATENT OFFICE.

REINHOLD BETTERMANN, OF JOHNSTOWN, PENNSYLVANIA.

CAR-AXLE.

SPECIFICATION forming part of Letters Patent No. 531,405, dated December 25, 894.

Application filed March 22, 1894. Serial No. 504,627. (No model.)

*To all whom it may concern:*

Be it known that I, REINHOLD BETTERMANN, a citizen of the United States, residing at Johnstown, in the county of Cambria and State of Pennsylvania, have invented certain new and useful Improvements in Supporters for Car-Axles, of which the following is a specification.

My invention relates to means for supporting the axles of cars and trucks, and its object is to firmly secure the axles to the car or truck-body in such manner that they are prevented from revolving with the wheels, or from moving endwise, so that the axles are always maintained in parallel position.

The invention consists of a clamp having a semi-cylindrical portion and end-wings through which the bolts for attaching the same are passed, the axle being received in said semi-cylindrical portion and being crowned by a saddle-piece received in suitable recesses of the clamp, and provided with a projecting-pin for entering a suitable socket in the axle; and my invention also consists of certain details of construction and combination of parts to be hereinafter described and then claimed.

In the accompanying drawings: Figure 1 is a cross-section of a portion of a car or truck-body, showing an axle attached rigidly thereto by my improvements. Fig. 2 is a section on line 2—2, Fig. 1, and Fig. 3 is a broken section on line 3—3, Fig. 2.

Similar letters of reference indicate corresponding parts.

Referring to the drawings, letter A indicates the body of a car, truck or the like to which an axle B is firmly attached, said axle having at each end the usual transverse bores to receive the linch-pins $b, b$, whereby the wheels are retained on the axle. Clamps having a semi-cylindrical central portion D and end-wings D' constitute the main support for the axle, the latter being seated in said semi-cylindrical portion, and the clamps being rigidly fastened to the body A by means of suitable bolts $e$ that pass through the body and the wings, and nuts $e'$ that are turned onto the screw-threaded ends of the bolts. At each side of the concave surface of the clamp in which the axle is received are formed angular recesses $f, f$, which receive the side portions of a saddle-block H, the same having a concavity $h$ and being provided with a pin $h'$ inserted into a bore made therein and projecting into said concavity. Said saddle-block is thick enough to extend above the clamp, the same being placed over the axle so that its pin $h'$ will enter the socket $b'$ of the latter, and so that its upper part can be seated in a suitable recess $a$ cut into the body A. Having seated the block H in the recess of the body and the pin $h'$ in the socket of the axle, the clamp is placed over the axle and the block and fastened to the body by means of the bolts and nuts. The axle will in this manner be securely held from rotation with the wheels, it being of course understood that duplicate parts are applied to each end of the axle. A collar-like projection or boss M is formed at one side of each of the clamps, one half of which is in reality a part of the semi-circular portion of the clamp, while the other half is a semicircular span which constitutes an abutment that projects over the side of the body and resists the endwise movement of the axle.

The described construction assists the bolts in holding both axles in parallel position when the wheels strike any obstacle.

Machine-cut square axles are expensive both of time and labor, but with my improvements round stock may be used, so as to enable a considerable saving.

Having thus described my invention, I claim as new and desire to secure by Letters Patent—

1. The herein-described supporter for car-axles, consisting of a clamping-member having a semi-cylindrical portion and end-wings, adapted to be attached to the car-body, and a saddle-block provided with a projecting-pin adapted to seat in a socket of the axle, substantially as set forth.

2. The herein-described supporter for car-axles, consisting of a clamping-member having a collar-portion through which the axle can pass, and adapted to abut against the side of the car-body, and a saddle-block provided with a projecting-pin adapted to seat in a socket of the axle, substantially as set forth.

3. The combination, with an axle provided with side sockets, of supporters consisting of clamping-members, saddle-blocks seated in said clamping-members, and pins projecting from the saddle-blocks and entering the sockets in the axle, substantially as set forth.

In testimony that I claim the foregoing as my invention, I have signed my name in presence of two subscribing witnesses.

REINHOLD BETTERMANN.

Witnesses:
DANIEL L. PARSONS,
DANIEL LYSETT.